United States Patent
Li et al.

(10) Patent No.: US 9,818,333 B2
(45) Date of Patent: Nov. 14, 2017

(54) METHOD OF SELF-ADAPTIVE CONVERSION FOR IMAGES

(71) Applicant: Shenzhen China Star Optoelectronics Technology Co., Ltd., Shenzhen, Guangdong (CN)

(72) Inventors: Hao Li, Guangdong (CN); Ming-Jong Jou, Guangdong (CN); Shen-sian Syu, Guangdong (CN); Yufeng Jin, Guangdong (CN); Lin Li, Guangdong (CN); Ronggang Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 170 days.

(21) Appl. No.: 14/901,033

(22) PCT Filed: Sep. 22, 2015

(86) PCT No.: PCT/CN2015/090203
§ 371 (c)(1),
(2) Date: Dec. 27, 2015

(87) PCT Pub. No.: WO2017/045218
PCT Pub. Date: Mar. 23, 2017

(65) Prior Publication Data
US 2017/0200405 A1 Jul. 13, 2017

(51) Int. Cl.
*G09G 3/20* (2006.01)

(52) U.S. Cl.
CPC ......... *G09G 3/2003* (2013.01); *G09G 3/2074* (2013.01); *G09G 2300/0452* (2013.01); *G09G 2320/0233* (2013.01); *G09G 2320/0673* (2013.01); *G09G 2340/06* (2013.01)

(58) Field of Classification Search
CPC ............... G09G 3/2003; G09G 3/2074; G09G 2300/0452; G09G 2320/0233; G09G 2320/0673; G09G 2340/06
USPC .................. 345/604; 382/162, 163, 166, 167
See application file for complete search history.

(56) References Cited

U.S. PATENT DOCUMENTS

| | | | |
|---|---|---|---|
| 2008/0150958 A1* | 6/2008 | Higgins | G09G 3/2003 345/591 |
| 2011/0148910 A1* | 6/2011 | Botzas | G09G 5/02 345/600 |
| 2011/0157212 A1* | 6/2011 | Zhang | H04N 9/67 345/590 |

(Continued)

*Primary Examiner* — King Poon
*Assistant Examiner* — Vincent Peren
(74) *Attorney, Agent, or Firm* — Andrew C. Cheng (57) ABSTRACT

A method of self-adaptive conversion for images includes: calculating the degree of color saturation of each pixel of an RGB image and original grey value of each primary color component, and calculating a global gain value; calculating a total gain value of each pixel based on the global gain value and the partial gain value of each pixel; enhancing luminance of the white color component of each primary color component of each pixel based on the total gain value of each pixel, so to output an RGBW image. The present invention improves deviated color saturation to ensure display quality while elevating the display luminance when a conversion from an RGB image into an RGBW image.

19 Claims, 4 Drawing Sheets

(56) References Cited

U.S. PATENT DOCUMENTS

| | | | |
|---|---|---|---|
| 2014/0285539 A1* | 9/2014 | Kurokawa | G09G 3/3406 345/690 |
| 2015/0213626 A1* | 7/2015 | Hekstra | H04N 1/6058 345/590 |
| 2016/0042698 A1* | 2/2016 | Yang | G09G 3/2096 345/690 |
| 2016/0117968 A1* | 4/2016 | Buckley | G09G 3/3466 345/590 |
| 2016/0171918 A1* | 6/2016 | Kim | G09G 3/3406 345/690 |

* cited by examiner

METHOD OF SELF-ADAPTIVE CONVERSION FOR IMAGES

BACKGROUND OF THE INVENTION

1. Field of the Invention

The present invention relates to the display technology, and more specifically, to a method of self-adaptive conversion for images.

2. Description of the Prior Art

A pixel of an existing panel comprises a red (R) sub-pixel, a green (G) sub-pixel, and a blue (B) sub-pixel. Current RGB panels display images through controlling the grey value (i.e. RGB value) of each pixel and mixing pixels into needed colors. As consumers are demanding higher transmission rate, lower energy consumption and better image quality, display panels that feature pixels comprising one R sub-pixel, G sub-pixel, B sub-pixel and white (W) sub-pixel appear in the market. They are known as RGBW panels.

When RGBW display panels show images, they need to convert the color space from RGB to RGBW, namely converting RGB images to RGBW images. To achieve this goal, the current technology treats the minimum RGB value inputted as the W value to be outputted. The inclusion of W sub-pixels significantly improves the luminance of the RGBW display panel and lowers the energy consumption at the same time. However, because the luminance is improved, RGBW panels have a smaller display color gamut and deviated color saturation when comparing with RGB panels, thus the display quality of RGBW panels is affected.

SUMMARY OF THE INVENTION

An object of embodiments of the present invention is to provide a method of self-adaptive conversion for images to realize the conversion of color space from RGB to RGBW, so to improve deviated color saturation and ensure display quality while improving the luminance of RGBW display panels.

According to the present invention, a method of self-adaptive conversion for images comprises: extracting an original grey value of each primary color component of a plurality of pixels of an inputted image, where the plurality of pixels is all the pixels of the inputted image or all the pixels of an area of the inputted image; linearizing normalized original grey values through inverse gamma correction, so to acquire a first middle grey value of each primary color component of each pixel; calculating the degree of color saturation of each pixel based on the first middle grey value of each primary color component; calculating a first middle grey value of the white color component and a second middle grey value of each primary color component of each pixel based on the first middle grey value of each primary color component; calculating a global gain value based on the first middle grey value of the white color component and the second middle grey value of each primary color component of the plurality of pixels; calculating a maximum partial gain value based on a pre-defined maximum total gain value and the global gain value; calculating a partial gain value of each pixel based on the maximum partial gain value and the degree of color saturation of each pixel; calculating a total gain value of each pixel based on the global gain value and the partial gain value of each pixel; enhancing luminance of the first middle grey value of the white color component and the second middle grey value of each primary color component of each pixel based on the total gain value of each pixel, so to acquire a second middle grey value of the white color component and a third middle grey value of each primary color component of each pixel; performing gamma correction to the second middle grey value of the white color component and the third middle grey value of each primary color component of each pixel, and mapping them on the corresponding display areas of an outputted image, so to acquire the final grey value of the white color component and primary color components of the corresponding pixels of the outputted image.

Furthermore, linearizing normalized original grey values through inverse gamma correction comprises the subsequent step: calculating a first middle grey value of each primary color component of each pixel by the following formula, $$RGB_i = \left(\frac{RGB}{H1}\right)^\gamma$$

where RGB is the original grey value of each primary color component of each pixel, $RGB_i$ is the first middle grey value of each primary color component of each pixel, H1 is the maximum grey value allowed by the inputted image, and $\gamma$ is a gamma correction factor.

Furthermore, calculating the degree of color saturation of each pixel based on the first middle grey value of each primary color component comprises the subsequent step: calculating the degree of color saturation of each pixel by the following formula, $$\text{Chroma} = 1 - \frac{M_i}{M_a}$$

where Chroma is the degree of color saturation of each pixel, $M_i$ is the minimum first middle grey value of each primary color component of each pixel, $M_a$ is the maximum first middle grey value of each primary color component of each pixel.

Furthermore, calculating the first middle grey value of the white color component and the second middle grey value of each primary color component of each pixel based on the first middle grey value of each primary color component comprises the subsequent step: calculating the first middle grey value of the white color component and a second middle grey value of each primary color component of each pixel by the following formula, $$W_{i1} = \begin{cases} \dfrac{M_a^2}{2}, & M_i^2 \geq \dfrac{M_a^2}{2} \\ M_i^2, & M_i^2 < \dfrac{M_a^2}{2} \end{cases}$$

$$RGB_{i1} = RGB_i - W_{i1}$$

where $W_{i1}$ is the first middle grey value of the white color component of each pixel, $M_i$ is the minimum first middle grey value of each primary color of each pixel, $RGB_i$ is the first middle grey value of each primary color component of each pixel, and $RGB_{i1}$ is the second middle grey value of each primary color component of each pixel.

Furthermore, calculating the global gain value based on the first middle grey value of the white color component and the second middle grey value of each primary color component of the plurality of pixels comprises the subsequent step: calculating the global gain value by the following formula, $$K_f = \frac{1}{\text{Max}_{frame}}$$

where $K_f$ is the global gain value, and $\text{Max}_{frame}$ is the first middle grey value of the white color component and the maximum second middle grey value of each primary color component of the plurality of pixels.

Furthermore, $\text{Max}_{frame}$ is the first middle grey value of the white color component and the maximum second middle grey value of each primary color component of all the pixels of the inputted image.

Furthermore, calculating the maximum partial gain value based on a pre-defined maximum total gain value and the global gain value comprises the subsequent step: calculating the maximum partial gain value by the following formula, $$K_{lm} = K_{limit} - K_f$$

where $K_{lm}$ is the maximum partial gain value, $K_{limit}$ is the pre-defined maximum total gain value and $K_f$ is the global gain value; calculating the partial gain value of each pixel based on the maximum partial gain value and the degree of color saturation of each pixel comprises the subsequent step: calculating the partial gain value of each pixel by the following formula, $$K_l = (1 - \text{Chroma}) \times K_{lm}$$

where $K_l$ is the partial gain value of each pixel and Chroma is the degree of color saturation of each pixel; calculating the total gain value of each pixel based on the global gain value and the partial gain value of each pixel comprises the subsequent step: calculating the total gain value of each pixel by the following formula, $$K = K_l + K_f$$

where K is the total gain value of each pixel.

Furthermore, enhancing luminance of the first middle grey value of the white color component and the second middle grey value of each primary color component of each pixel based on the total gain value of each pixel comprises the subsequent step: calculating the second grey value of the white color component and the third middle grey value of each primary color component by the following formula:

$$RGBW_{i2} = RGBW_{i1} \times K$$

where $RGBW_{i2}$ is the second middle grey value of the white color component and the third middle grey value of each primary color component of each pixel, $RGBW_{i1}$ is the first middle grey value of the white color component and the second middle grey value of each primary color component of each pixel, and K is the total gain value of each pixel.

Furthermore, performing gamma correction to the second middle grey value of the white color component and the third middle grey value of each primary color component of each pixel, and mapping them on the corresponding display areas of an outputted image comprises the subsequent step: calculating the final grey value of the white color component and the primary color component of each corresponding pixel of the outputted image by the following formula:

$$RGBW_{out} = H2 \times (RGBW_{i2})^{\frac{1}{\gamma}}$$

where $RGBW_{out}$ is the final grey value of the white color component and the primary color component of each pixel of the outputted image, $RGBW_{i2}$ is the second middle grey value of the white color component and the third middle grey value of each primary color component of each pixel, H2 is the maximum grey value allowed by the outputted image and $\gamma$ is the gamma correction factor.

According to the present invention, a method of self-adaptive conversion for images, comprises: extracting an original grey value of each primary color component of a plurality of pixels of an inputted image; linearizing normalized original grey values through inverse gamma correction, so to acquire a first middle grey value of each primary color component of each pixel; calculating the degree of color saturation of each pixel based on the first middle grey value of each primary color component; calculating a first middle grey value of the white color component and a second middle grey value of each primary color component of each pixel based on the first middle grey value of each primary color component; calculating a global gain value based on the first middle grey value of the white color component and the second middle grey value of each primary color component of the plurality of pixels; calculating a total gain of each pixel based on the global gain value and the degree of color saturation of each pixel; enhancing luminance of the first middle grey value of the white color component and the second middle grey value of each primary color component of each pixel based on the total gain value of each pixel, so to acquire a second middle grey value of the white color component and a third middle grey value of each primary color component of each pixel; performing gamma correction to the second middle grey value of the white color component and the third middle grey value of each primary color component of each pixel, and mapping them on the corresponding display areas of an outputted image, so to acquire a final grey value of the white color component and primary color components of the corresponding pixels of the outputted image.

Furthermore, linearizing normalized original grey values through inverse gamma correction comprises the subsequent step: calculating a first middle grey value of each primary color component of each pixel by the following formula, $$RGB_i = \left(\frac{RGB}{H1}\right)^{\gamma}$$

where RGB is the original grey value of each primary color component of each pixel, $RGB_i$ is the first middle grey value of each primary color component of each pixel, H1 is the maximum grey value allowed by the inputted image, and $\gamma$ is a gamma correction factor.

Furthermore, calculating the degree of color saturation of each pixel based on the first middle grey value of each primary color component comprises the subsequent step: calculating the degree of color saturation of each pixel by the following formula, $$\text{Chroma} = 1 - \frac{M_i}{M_a}$$

where Chroma is the degree of color saturation of each pixel, $M_i$ is the minimum first middle grey value of each primary color component of each pixel, $M_a$ is the maximum first middle grey value of each primary color component of each pixel.

Furthermore, calculating the first middle grey value of the white color component and the second middle grey value of each primary color component of each pixel based on the first middle grey value of each primary color component comprises the subsequent step: calculating the first middle grey value of the white color component and a second middle grey value of each primary color component of each pixel by the following formula, $$W_{i1} = \begin{cases} \dfrac{M_a^2}{2}, & M_i^2 \geq \dfrac{M_a^2}{2} \\ M_i^2, & M_i^2 < \dfrac{M_a^2}{2} \end{cases}$$

$$RGB_{i1} = RGB_i - W_{i1}$$

where $W_{i1}$ is the first middle grey value of the white color component of each pixel, $M_i$ is the minimum first middle grey value of each primary color of each pixel, $RGB_i$ is the first middle grey value of each primary color component of each pixel, and $RGB_{i1}$ is the second middle grey value of each primary color component of each pixel.

Furthermore, calculating the global gain value based on the first middle grey value of the white color component and the second middle grey value of each primary color component of the plurality of pixels comprises the subsequent step: calculating the global gain value by the following formula, $$K_f = \frac{1}{\text{Max}_{frame}}$$

where $K_f$ is the global gain value, and $\text{Max}_{frame}$ is the first middle grey value of the white color component and the maximum second middle grey value of each primary color component of the plurality of pixels.

Furthermore, $\text{Max}_{frame}$ is the first middle grey value of the white color component and the maximum second middle grey value of each primary color component of all the pixels of the inputted image.

Furthermore, calculating the total gain of each pixel based on the global gain value and the degree of color saturation of each pixel comprises the subsequent steps: calculating a maximum partial gain value based on a pre-defined maximum total gain value and the global gain value; calculating a partial gain value of each pixel based on the maximum partial gain value and the degree of color saturation of each pixel; calculating a total gain value of each pixel based on the global gain value and the partial gain value of each pixel.

Furthermore, calculating the maximum partial gain value based on a pre-defined maximum total gain value and the global gain value comprises the subsequent step: calculating the maximum partial gain value by the following formula, $$K_{lm} = K_{limit} - K_f$$

where $K_{lm}$ is the maximum partial gain value, $K_{limit}$ is the pre-defined maximum total gain value and $K_f$ is the global gain value; calculating the partial gain value of each pixel based on the maximum partial gain value and the degree of color saturation of each pixel comprises the subsequent step: calculating the partial gain value of each pixel by the following formula, $$K_l = (1 - \text{Chroma}) \times K_{lm}$$

where $K_l$ is the partial gain value of each pixel and Chroma is the degree of color saturation of each pixel; calculating the total gain value of each pixel based on the global gain value and the partial gain value of each pixel comprises the subsequent step: calculating the total gain value of each pixel by the following formula, $$K = K_f + K_l$$

where K is the total gain value of each pixel.

Furthermore, enhancing luminance of the first middle grey value of the white color component and the second middle grey value of each primary color component of each pixel based on the total gain value of each pixel comprises the subsequent step: calculating the second grey value of the white color component and the third middle grey value of each primary color component by the following formula:

$$RGBW_{i2} = RGBW_{i1} \times K$$

where $RGBW_{i2}$ is the second middle grey value of the white color component and the third middle grey value of each primary color component of each pixel, $RGBW_{i1}$ is the first middle grey value of the white color component and the second middle grey value of each primary color component of each pixel, and K is the total gain value of each pixel.

Furthermore, performing gamma correction to the second middle grey value of the white color component and the third middle grey value of each primary color component of each pixel, and mapping them on the corresponding display areas of an outputted image comprises the subsequent step: calculating the final grey value of the white color component and the primary color component of each corresponding pixel of the outputted image by the following formula:

$$RGBW_{out} = H2 \times (RGBW_{i2})^{\frac{1}{\gamma}}$$

where $RGBW_{out}$ is the final grey value of the white color component and the primary color component of each pixel of the outputted image, $RGBW_{i2}$ is the second middle grey value of the white color component and the third middle grey value of each primary color component of each pixel, H2 is the maximum grey value allowed by the outputted image and $\gamma$ is the gamma correction factor.

The method of self-adaptive conversion for images of embodiments of the present invention distinguishes pixels based on the degree of color saturation of pixels of inputted RGB images. It also provides corresponding gain to pixels of different degrees of color saturation, so that pixels of outputted RGBW images are also provided with gain. Therefore, it improves deviated color saturation to ensure display quality while elevating the display luminance.

BRIEF DESCRIPTION OF THE DRAWINGS

For better understanding embodiments of the present invention, the following detailed description taken in conjunction with the accompanying drawings is provided. Apparently, the accompanying drawings are merely for some of the embodiments of the present invention. Any ordinarily skilled person in the technical field of the present invention could still obtain other accompanying drawings without use laborious invention based on the present accompanying drawings.

DETAILED DESCRIPTION OF THE PREFERRED EMBODIMENTS

The accompanying drawings are included to provide a further understanding of the invention, and are incorporated in and constitute a part of this specification. The drawings illustrate embodiments of the invention and, together with the description, serve to explain the principles of the invention.

Figure 1:
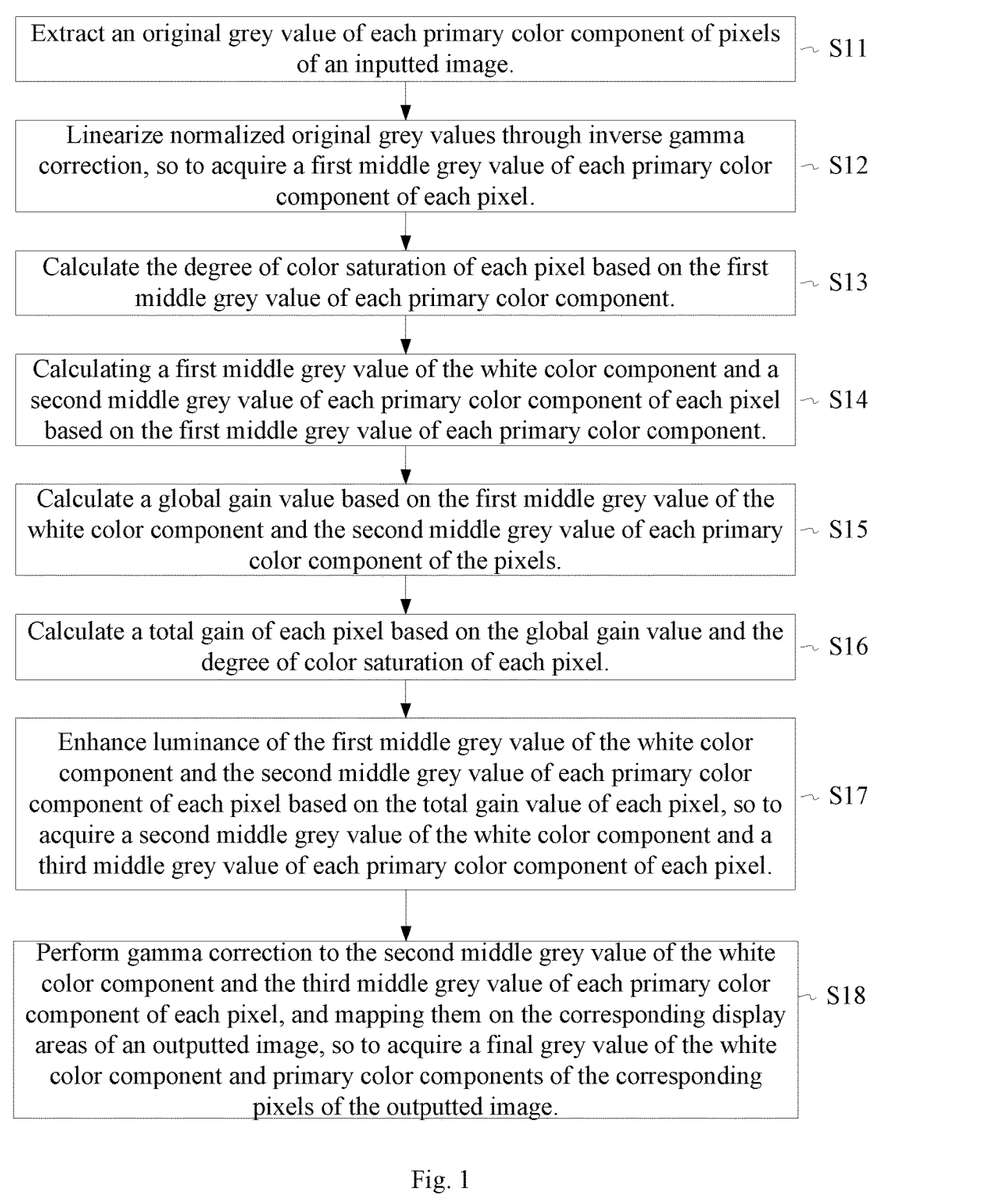
FIG. 1 is a flow chart of the method of self-adaptive conversion for images of an embodiment of the present invention.
Figure 2:
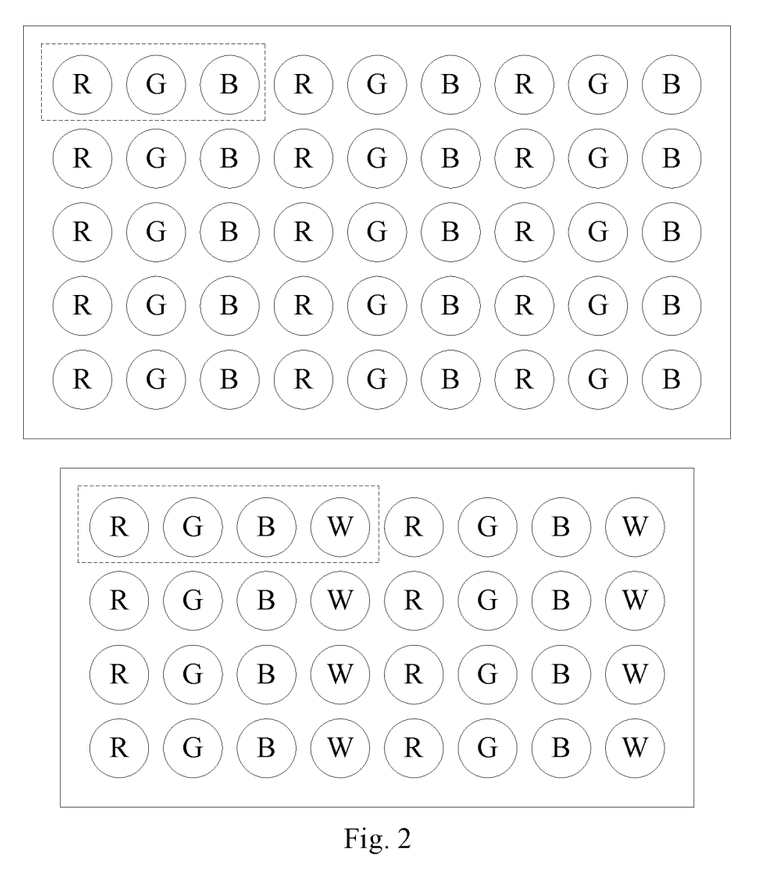
FIG. 2 shows an arrangement of subpixels converted from RGB image to RGBW image according to the present invention.

FIG. 1 is a flow chart of the method of self-adaptive conversion for images of an embodiment of the present invention. It can be applied to conversion from three primary color components to four color components, such as the conversion of color space from RGB to RGBW-converting RGB images to RGBW images for display devices. The method of the present embodiment can be understood by referring to both FIG. 1 and FIG. 2. For example, the grey value of the R, G and B sub-pixels of a RGB image, circled by a dotted line in FIG. 2, corresponds to the grey value of the R, G, B and W sub-pixels that are at the corresponding position after the color space conversion. The display devices described by the embodiment of the present invention include but are not limited to organic light-emitting diodes (OLED) displays and liquid crystal display (LCD).

Please refer to FIG. 1. The method of self-adaptive conversion for images comprises the following steps:

Step S11: extract the original grey values of each primary color component of a plurality of pixels of an inputted image.

Step S12: acquire a first middle grey value of each primary color component of each pixel by linearize the original grey values through inverse gamma correction after the original grey values are normalized.

The purpose of normalizing the original grey values (RGB value) of the primary color components R, G and B is to transform these three figures into relative values to each other, so to simplify the calculation afterwards.

To linearize means to convert the inputted RGB values into outputted luminance values that are linearly proportional. The embodiment of the present invention can acquire the first middle grey value of each primary color component of each pixel through, but not limited to, the following Formula 1-1.

$$RGB_i = \left(\frac{RGB}{H1}\right)^\gamma \quad \text{Formula 1-1}$$

In Formula 1-1, RGB is the original grey values of the primary color components R, G and B; RGBi is the first middle grey value of each primary color component of each pixel; H1 is the maximum grey value allowed by inputted image; and $\gamma$ is the gamma correction factor.

Note that Formula 1-1 should be understood based on the subsequent description: when calculating the first middle grey value of the primary color component R, RGB is the original grey value of the primary color component R of each pixel, and RGBi is the first middle grey value of the primary color component R of each pixel. When calculating the first grey value of the primary color component G, RGB is the original grey value of the primary color component G of each pixel, and RGBi is the first middle grey value of the primary color component G of each pixel. When calculating the first grey value of the primary color component B, RGB is the original grey value of the primary color component B of each pixel, and RGBi is the first middle grey value of the primary color component B of each pixel.

Step S13: calculate the degree of color saturation of each pixel based on the first middle grey value of each primary color component.

The embodiment of the present invention can acquire the degree of color saturation of each pixel through, but not limited to, the following Formula 1-2.

$$\text{Chroma} = 1 - \frac{M_i}{M_a} \quad \text{Formula 1-2}$$

In Formula 1-2, Chroma is the degree of color saturation of each pixel; Mi is the minimum first middle grey value of the primary color components R, G and B, namely Mi=min (Ri, Gi, Bi); $M_a$ is the maximum first middle grey value of each primary color component of each pixel, namely $M_a$=max ($R_i$, $G_i$, $B_i$); $R_i$ is the first middle grey value of the primary color component R of each pixel; $G_i$ is the first middle grey value of the primary color component G of each pixel; and $B_i$ is the first middle grey value of the primary color component B of each pixel.

Step S14: calculate the first middle grey value of the white color component and the second middle grey value of each primary color component of each pixel based on the first middle grey value of each primary color component.

The embodiment of the present invention can acquire the first middle grey value of the white color component of each pixel through, but not limited to, the following Formula 1-3. It can further acquire the second middle grey value of each primary color component of each pixel through, but not limited to, the following Formula 1-4.

$$W_{i1} \begin{cases} \dfrac{M_a^2}{2}, & M_i^2 \geq \dfrac{M_a^2}{2} \\ M_i^2, & M_i^2 < \dfrac{M_a^2}{2} \end{cases} \quad \text{Formula 1-3}$$

$$RGB_{i1} = RGB_i - W_{i1} \quad \text{Formula 1-4}$$

Based on the description of the implication of each sign in Formula 1-1 and Formula 1-2, $W_{i1}$ in Formulas 1-3 and 1-4 is the first middle grey value of the white color component W of each pixel; $RGB_{i1}$ is the second middle grey value of each primary color component of each pixel.

Note that Formula 1-4 should be understood based on the subsequent description: when calculating the second middle grey value of the primary color component R, $RGB_i$ is the first middle grey value of the primary color component R of each pixel, and $RGB_{i1}$ is the second middle grey value of the primary color component R of each pixel. When calculating the second middle grey value of the primary color component G, $RGB_i$ is the first middle grey value of the primary color component G of each pixel, and $RGB_i$ is the second middle grey value of the primary color component G of each pixel. When calculating the second middle grey value of the primary color component B, $RGB_i$ is the first middle grey value of the primary color component B of each pixel, and $RGB_{i1}$ is the second middle grey value of the primary color component B of each pixel.

Step S15: calculate the global gain value based on the second middle grey value of each primary color component and the first middle grey value of the white color component of a plurality of pixels.

The embodiment of the present invention can acquire the global gain value through, but not limited to, the following Formula 1-5.

$$K_f = \frac{1}{\text{Max}_{frame}} \quad \text{Formula 1-5}$$

In Formula 1-5, $K_f$ is the global gain value, and $\text{Max}_{frame}$ is the first middle grey value of the white color component of a plurality of pixels and the maximum second middle grey value of each primary color component, namely $$\text{Max}_{frame} = \max_{x \in \{W*H\}} \{\max(R_{i1}(x), G_{i1}(x), B_{i1}(x), W_{i1}(x))\},$$

in which W*H is the resolution of inputted images, with W referring to the width and H referring to the height; and x is any one of the plurality of pixels.

What should be understood is that the plurality of pixels can be pixels of an area of the inputted image (i.e. the RGB image) or all the pixels of the entire inputted image. When the plurality of pixels is all the pixels of the entire inputted image, $\text{Max}_{frame}$ should be understood as the first middle grey value of the white color component and the maximum second middle grey value of each primary color component of all the pixels of the inputted image.

Step S16: calculate a total gain value of each pixel based on the global gain value and the degree of color saturation of each pixel.

First, calculate the maximum partial gain value based on the pre-defined maximum total gain value and the global gain value. For example, the maximum partial gain value can be acquired through the following Formula 1-6.

$$K_{lm} = K_{limit} - K_f \quad \text{Formula 1-6}$$

Then, calculate the partial gain value of each pixel based on the maximum partial gain value and the degree of color saturation of each pixel. For example, the partial gain value can be acquired through the following formula 1-7.

$$K_f = (1 - \text{Chroma}) \times K_{lm} \quad \text{Formula 1-7}$$

Lastly, calculate the total gain value of each pixel based on the global gain value and the partial gain value of each pixel. For example, the total gain value of each pixel can be acquired through the following Formula 1-8.

$$K = K_f + K_f \quad \text{Formula 1-8}$$

Based on the description of the implication of each sign in previously mentioned formulas, $K_{lm}$ is the maximum partial gain value, $K_{limit}$ is the pre-defined maximum total gain value, $K_i$ is the partial gain value of each pixel, and K is the total gain value of each pixel.

Step S17: enhance luminance of the first middle grey value of the white color component and the second middle grey value of each primary color component of each pixel based on the total gain value of each pixel, so to acquire a third middle grey value of each primary color component and a second middle grey value of the white color component of each pixel.

The embodiment of the present invention can acquire the second middle grey value of the white color component and the third middle grey value of each primary color component of each pixel through, but not limited to, the following Formula 1-9.

$$RGBW_{i2} = RGBW_{i1} \times K \quad \text{Formula 1-9}$$

In Formula 1-9, $RGBW_{i2}$ is the third middle grey value of each primary color and the second middle grey value of the white color component of each pixel. $RGBW_{i1}$ is the first middle grey value of the white color component and the second middle grey value of each primary color component of each pixel.

Similar to previous formulas, Formula 1-9 should be understood based on the subsequent description: when calculating the second middle grey value of the white color component, $RGBW_{i1}$ is the first middle grey value of the white color component of each pixel, and $RGBW_{i2}$ is the third middle grey value of the white component of each pixel. When calculating the third middle grey value of the primary color component R, $RGBW_{i1}$ is the second middle grey value of the primary color component R of each pixel, and $RGBW_{i2}$ is the third middle grey value of the primary color component R of each pixel. When calculating the third middle grey value of the primary color component G, $RGBW_{i1}$ is the second middle grey value of the primary color component G of each pixel, and $RGBW_{i2}$ is the third middle grey value of the primary color component G of each pixel. When calculating the third middle grey value of the primary color component B, $RGBW_{i1}$ is the second middle grey value of the primary color component B of each pixel, and $RGBW_{i2}$ is the third middle grey value of the primary color component B of each pixel.

Step S18: perform gamma correction to the second middle grey value of the white color component and the third middle grey value of each primary color component of each pixel, and map them on the corresponding display areas of outputted images, so to acquire the final grey value of the white color component and primary color components of the corresponding pixels of outputted images.

The embodiment of the present invention can acquire the final grey value of the white color component and primary color components of the corresponding pixels of outputted images through, but not limited to, the following Formula 1-10.

$$RGBW_{out} = H2 \times (RGBW_{i2})^{\frac{1}{\gamma}} \quad \text{Formula 1-10}$$

In Formula 10, $RGBW_{out}$ is the final grey value of the white color component and primary color components of the corresponding pixels of outputted images, and H2 is the maximum grey value allowed by outputted images.

Formula 1-10 should be understood based on the subsequent description: when calculating the final grey value of the white color component, $RGBW_{i2}$ is the second middle grey value of the white color component of each pixel, and $RGBW_{out}$ is the final grey value of the white color component of each pixel. When calculating the final grey value of the primary color component R, $RGBW_{i2}$ is the third middle grey value of the primary color component R of each pixel, and $RGBW_{out}$ is the final grey value of the primary color component R of each pixel. When calculating the final grey value of the primary color component G, $RGBW_{i2}$ is the third middle grey value of the primary color component G of each pixel, and $RGBW_{out}$ is the final grey value of the primary color component G of each pixel. When calculating the final grey value of the primary color component B, $RGBW_{i2}$ is the third middle grey value of the primary color component B of each pixel, and $RGBW_{out}$ is the final grey value of the primary color component B of each pixel.

Based on the previous descriptions, the embodiment of the present invention, in practice, distinguishes pixels based on the degree of color saturation of pixels of inputted RGB images, and provides corresponding gain to pixels of different degrees of color saturation, so that pixels of outputted RGBW images are also provided with gain. Therefore it improves deviated color saturation to ensure display quality while elevating display luminance.

The conversion of color space from RGB to RGBW can be done by adopting a colorimetric model of the Commission Internationale de l'Eclairage (CIE) Lab so to be in line with beneficial effects of the method of embodiments of the present invention. Specifically, the margin of average luminance increase of outputted RGBW images can be calculated through the following Formula 2-1, and form a line chart as FIG. 3.

Figure 3:
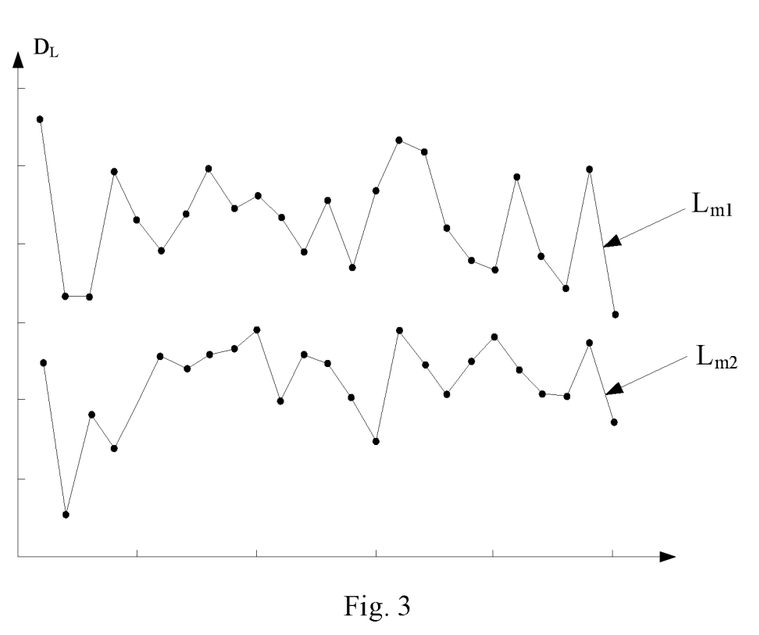
FIG. 3 illustrates a comparison of average luminance gain between the method of embodiments of the present invention and the conventional method.
Figure 4:
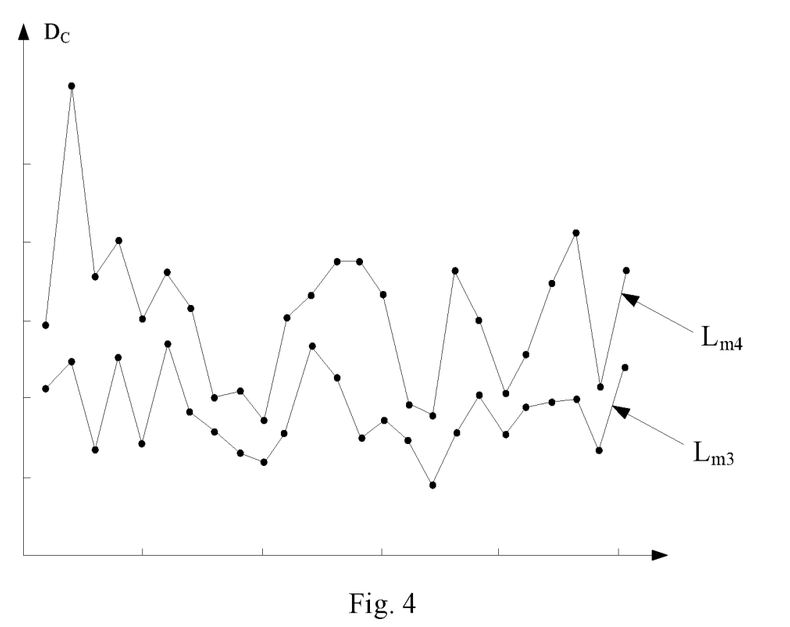
FIG. 4 shows a comparison of color saturation deviation between the method of embodiments of the present invention and the conventional method.

In FIG. 3, $L_{m1}$ represents the margin of average luminance increase of RGBW images outputted by the method shown in FIG. 1, and $L_{m2}$ presents the margin of average luminance increase of RGBW images outputted by existing technology. The horizontal axis stands for a sequence comprising samples of 25 images, and the vertical axis stands for the margin of average luminance increase (measured in percentage). The average color deviation of outputted RGBW images can be calculated through the following Formula 2-2, and form a line chart as FIG. 4. In FIG. 4, $L_{m3}$ represents the average color deviation of RGBW images outputted by the method shown in FIG. 1, and $L_{m4}$ presents the average color deviation of RGBW images outputted by the existing technology. The horizontal axis stands for a sequence comprising samples of 25 images, and the vertical axis stands for average color deviation.

$$D_L = \frac{(L_{RGBW} - L_{RGB})}{L_{RGB}} \times 100\% \qquad \text{Formula 2-1}$$

$$D_C = \sqrt{|a_{RGBW} - a_{RGB}|^2 + |b_{RGBW} - b_{RGB}|^2} \qquad \text{Formula 2-2}$$

In Formulas 2-1 and 2-2, $D_L$ is the margin of average luminance increase, $L_{RGBW}$ is the grey value of normalized primary color component and white color component of each pixel of outputted RGBW images, $L_{RGB}$ is the grey value of normalized primary color component and white color component of each pixel of inputted RGB images, $D_C$ is the average color deviation, $a_{RGBW}$ and $b_{RGBW}$ are two components of color information of the normalized white color component and primary color component of each pixel of RGBW images, and $a_{RGB}$ and $b_{RGB}$ are two components of color information of the normalized white color component and primary color component of each pixel of RGB images.

FIG. 3 shows that comparing with existing technology, the method of embodiments of the present invention can acquire higher average luminance gain. FIG. 4 further shows that the method of embodiments of the present invention can lower the color saturation deviation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of self-adaptive conversion for images, comprising:
   extracting an original grey value of each primary color component of a plurality of pixels of an inputted image, wherein the plurality of pixels is all the pixels of the inputted image or all the pixels of an area of the inputted image;
   linearizing normalized original grey values through inverse gamma correction, so to acquire a first middle grey value of each primary color component of each pixel;
   calculating a degree of color saturation of each pixel based on the first middle grey value of each primary color component;
   calculating a first middle grey value of a white color component and a second middle grey value of each primary color component of each pixel based on the first middle grey value of each primary color component;
   calculating a global gain value based on the first middle grey value of the white color component and the second middle grey value of each primary color component of the plurality of pixels;
   calculating a maximum partial gain value based on a pre-defined maximum total gain value and the global gain value;
   calculating a maximum partial gain value based on a pre-defined maximum total gain value and the global gain value;
   calculating a total gain value of each pixel based on the global gain value and the partial gain value of each pixel;
   enhancing luminance of the first middle grey value of the white color component and the second middle grey value of each primary color component of each pixel based on the total gain value of each pixel, so to acquire a second middle grey value of the white color component and a third middle grey value of each primary color component of each pixel;
   performing gamma correction to the second middle grey value of the white color component and the third middle grey value of each primary color component of each pixel, so to acquire final grey values of the white color component and primary color components of corresponding pixels of an outputted image; and
   mapping the final grey values of the white color component and primary color components of the corresponding pixels of the outputted image to corresponding display areas of a display device to display the outputted image.

2. The method of claim 1, wherein linearizing normalized original grey values through inverse gamma correction comprises:
calculating the first middle grey value of each primary color component of each pixel by the following formula, $$RGB_i = \left(\frac{RGB}{H1}\right)^\gamma$$

where RGB is the original grey value of each primary color component of each pixel, $RGB_i$ is the first middle grey value of each primary color component of each pixel, H1 is a maximum grey value allowed by the inputted image, and γ is a gamma correction factor.

3. The method of claim 1, wherein calculating the degree of color saturation of each pixel based on the first middle grey value of each primary color component comprises:
calculating the degree of color saturation of each pixel by the following formula, $$\text{Chroma} = 1 - \frac{M_i}{M_a}$$

where Chroma is the degree of color saturation of each pixel, $M_i$ is a minimum first middle grey value of each primary color component of each pixel, $M_a$ is a maximum first middle grey value of each primary color component of each pixel.

4. The method of claim 1, wherein calculating the first middle grey value of the white color component and the second middle grey value of each primary color component of each pixel based on the first middle grey value of each primary color component comprises:
calculating the first middle grey value of the white color component and the second middle grey value of each primary color component of each pixel by the following formula, $$W_{i1} \begin{cases} \frac{M_a^2}{2}, & M_i^2 \geq \frac{M_a^2}{2} \\ M_i^2, & M_i^2 < \frac{M_a^2}{2} \end{cases}$$

$$RGB_{i1} = RGB_i - W_{i1}$$

where $W_{i1}$ is the first middle grey value of the white color component of each pixel, $M_a$ is a maximum first middle grey value of each primary color component of each pixel, $M_i$ is a minimum first middle grey value of each primary color of each pixel, $RGB_i$ is the first middle grey value of each primary color component of each pixel, and $RGB_{i1}$ is the second middle grey value of each primary color component of each pixel.

5. The method of claim 1, wherein calculating the global gain value based on the first middle grey value of the white color component and the second middle grey value of each primary color component of the plurality of pixels comprises:
calculating the global gain value by the following formula, $$K_f = \frac{1}{\text{Max}_{frame}}$$

where $K_f$ is the global gain value, and $\text{Max}_{frame}$ is the first middle grey value of the white color component and a maximum second middle grey value of each primary color component of the plurality of pixels.

6. The method of claim 5, wherein $\text{Max}_{frame}$ is the first middle grey value of the white color component and the maximum second middle grey value of each primary color component of all the pixels of the inputted image.

7. The method of claim 1, wherein calculating the maximum partial gain value based on the pre-defined maximum total gain value and the global gain value comprises:
calculating the maximum partial gain value by the following formula, $$K_{lm} = K_{limit} - K_f$$

where $K_{lm}$ is the maximum partial gain value, $K_{limit}$ is the pre-defined maximum total gain value and Kf is the global gain value;
wherein calculating the partial gain value of each pixel based on the maximum partial gain value and the degree of color saturation of each pixel comprises:
calculating the partial gain value of each pixel by the following formula, $$K_l = (1 - \text{Chroma}) \times K_{lm}$$

where $K_l$ is the partial gain value of each pixel and Chroma is a degree of color saturation of each pixel; and
wherein calculating the total gain value of each pixel based on the global gain value and the partial gain value of each pixel comprises:
calculating the total gain value of each pixel by the following formula, $$K = K_l + K_f$$

where K is the total gain value of each pixel.

8. The method of claim 1, wherein enhancing luminance of the first middle grey value of the white color component and the second middle grey value of each primary color component of each pixel based on the total gain value of each pixel comprises:
calculating the second grey value of the white color component and the third middle grey value of each primary color component by the following formula:

$$RGBW_{i2} = RGBW_{i1} \times K$$

where $RGBW_{i2}$ is the second middle grey value of the white color component and the third middle grey value of each primary color component of each pixel, $RGBW_{i1}$ is the first middle grey value of the white color component and the second middle grey value of each primary color component of each pixel, and K is the total gain value of each pixel.

9. The method of claim 1, wherein performing gamma correction to the second middle grey value of the white color component and the third middle grey value of each primary color component of each pixel, so to acquire the final grey values of the white color component and primary color components of corresponding pixels of the outputted image comprises:
calculating the final grey value of the white color component and the primary color components of each corresponding pixel of the outputted image by the following formula:

$$RGBW_{out} = H2 \times (RGBW_{i2})^{\frac{1}{\gamma}}$$

where $RGBW_{out}$ is the final grey value of the white color component and the primary color components of each pixel of the outputted image, $RGBW_{i2}$ is the second middle grey value of the white color component and the third middle grey value of each primary color component of each pixel, H2 is a maximum grey value allowed by the outputted image and γ is a gamma correction factor.

10. A method of self-adaptive conversion for images, comprising:
   extracting an original grey value of each primary color component of a plurality of pixels of an inputted image;
   linearizing normalized original grey values through inverse gamma correction, so to acquire a first middle grey value of each primary color component of each pixel;
   calculating a degree of color saturation of each pixel based on the first middle grey value of each primary color component;
   calculating a first middle grey value of a white color component and a second middle grey value of each primary color component of each pixel based on the first middle grey value of each primary color component;
   calculating a global gain value based on the first middle grey value of the white color component and the second middle grey value of each primary color component of the plurality of pixels;
   calculating a total gain of each pixel based on the global gain value and the degree of color saturation of each pixel;
   enhancing luminance of the first middle grey value of the white color component and the second middle grey value of each primary color component of each pixel based on the total gain value of each pixel, so to acquire a second middle grey value of the white color component and a third middle grey value of each primary color component of each pixel;
   performing gamma correction to the second middle grey value of the white color component and the third middle grey value of each primary color component of each pixel, so to acquire final grey values of the white color component and primary color components of corresponding pixels of an outputted image; and
   mapping the final grey values of the white color component and primary color components of the corresponding pixels of the outputted image to corresponding display areas of a display device to display the outputted image.

11. The method of claim 10, wherein linearizing normalized original grey values through inverse gamma correction comprises:
   calculating the first middle grey value of each primary color component of each pixel by the following formula, $$RGB_i = \left(\frac{RGB}{H1}\right)^{\gamma}$$

where RGB is the original grey value of each primary color component of each pixel, $RGB_i$ is the first middle grey value of each primary color component of each pixel, H1 is a maximum grey value allowed by the inputted image, and γ is a gamma correction factor.

12. The method of claim 10, wherein calculating the degree of color saturation of each pixel based on the first middle grey value of each primary color component comprises:
   calculating the degree of color saturation of each pixel by the following formula, $$\text{Chroma} = 1 - \frac{M_i}{M_a}$$

where Chroma is the degree of color saturation of each pixel, $M_i$ is a minimum first middle grey value of each primary color component of each pixel, $M_a$ is a maximum first middle grey value of each primary color component of each pixel.

13. The method of claim 10, wherein calculating the first middle grey value of the white color component and the second middle grey value of each primary color component of each pixel based on the first middle grey value of each primary color component comprises:
   calculating the first middle grey value of the white color component and the second middle grey value of each primary color component of each pixel by the following formula, $$W_{i1} \begin{cases} \frac{M_a^2}{2}, & M_i^2 \geq \frac{M_a^2}{2} \\ M_i^2, & M_i^2 < \frac{M_a^2}{2} \end{cases}$$

$$RGB_{i1} = RGB_i - W_{i1}$$

where $W_{i1}$ is the first middle grey value of the white color component of each pixel, $M_a$ is a maximum first middle grey value of each primary color component of each pixel, $M_i$ is a minimum first middle grey value of each primary color of each pixel, $RGB_i$ is the first middle grey value of each primary color component of each pixel, and $RGB_{i1}$ is the second middle grey value of each primary color component of each pixel.

14. The method of claim 10, wherein calculating the global gain value based on the first middle grey value of the white color component and the second middle grey value of each primary color component of the plurality of pixels comprises:
   calculating the global gain value by the following formula, $$K_f = \frac{1}{\text{Max}_{frame}}$$

where $K_f$ is the global gain value, and $\text{Max}_{frame}$ is the first middle grey value of the white color component and a maximum second middle grey value of each primary color component of the plurality of pixels.

15. The method of claim 14, wherein $\text{Max}_{frame}$ is the first middle grey value of the white color component and the maximum second middle grey value of each primary color component of all the pixels of the inputted image.

16. The method of claim 10, wherein calculating the total gain of each pixel based on the global gain value and the degree of color saturation of each pixel comprises:

calculating a maximum partial gain value based on a pre-defined maximum total gain value and the global gain value;

calculating a partial gain value of each pixel based on the maximum partial gain value and the degree of color saturation of each pixel; and calculating the total gain value of each pixel based on the global gain value and the partial gain value of each pixel.

17. The method of claim 16, wherein calculating the maximum partial gain value based on the pre-defined maximum total gain value and the global gain value comprises:

calculating the maximum partial gain value by the following formula, $$K_{lm}=K_{limit}-K_f$$

where $K_{lm}$ is the maximum partial gain value, $K_{limit}$ is the pre-defined maximum total gain value and $K_f$ is the global gain value;

wherein calculating the partial gain value of each pixel based on the maximum partial gain value and the degree of color saturation of each pixel comprises:

calculating the partial gain value of each pixel by the following formula, $$K_f=(1-\text{Chroma})\times K_{lm}$$

where $K_l$ is the partial gain value of each pixel and Chroma is a degree of color saturation of each pixel; and wherein calculating the total gain value of each pixel based on the global gain value and the partial gain value of each pixel comprises:

calculating the total gain value of each pixel by the following formula, $$K=K_l+K_f$$

where K is the total gain value of each pixel.

18. The method of claim 10, wherein enhancing luminance of the first middle grey value of the white color component and the second middle grey value of each primary color component of each pixel based on the total gain value of each pixel comprises:

calculating the second grey value of the white color component and the third middle grey value of each primary color component by the following formula:

$$RGBW_{i2}=RGBW_{i1}\times K$$

where $RGBW_{i2}$ is the second middle grey value of the white color component and the third middle grey value of each primary color component of each pixel, $RGBW_{i1}$ is the first middle grey value of the white color component and the second middle grey value of each primary color component of each pixel, and K is the total gain value of each pixel.

19. The method of claim 10, wherein performing gamma correction to the second middle grey value of the white color component and the third middle grey value of each primary color component of each pixel, so to acquire the final grey values of the white color component and primary color components of corresponding pixels of the outputted image comprises:

calculating the final grey value of the white color component and the primary color components of each corresponding pixel of the outputted image by the following formula:

$$RGBW_{out}=H2\times(RGBW_{i2})^{\frac{1}{\gamma}}$$

where $RGBW_{out}$ is the final grey value of the white color component and the primary color components of each pixel of the outputted image, $RGBW_{i2}$ is the second middle grey value of the white color component and the third middle grey value of each primary color component of each pixel, H2 is a maximum grey value allowed by the outputted image and $\gamma$ is a gamma correction factor.

* * * * *